US012663931B2

(12) United States Patent
Kim

(10) Patent No.: US 12,663,931 B2
(45) Date of Patent: Jun. 23, 2026

(54) STORAGE DEVICE FOR MANAGING MAP INFORMATION PROVIDED TO HOST AND METHOD OF OPERATING THE SAME

(71) Applicant: SK hynix Inc., Icheon-si (KR)

(72) Inventor: Jung Woo Kim, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 9 days.

(21) Appl. No.: 18/606,502

(22) Filed: Mar. 15, 2024

(65) Prior Publication Data

US 2025/0123762 A1 Apr. 17, 2025

(30) Foreign Application Priority Data

Oct. 11, 2023 (KR) ......................... 10-2023-0135219

(51) Int. Cl.
*G06F 3/06* (2006.01)
(52) U.S. Cl.
CPC .......... *G06F 3/0634* (2013.01); *G06F 3/0604* (2013.01); *G06F 3/0679* (2013.01)
(58) Field of Classification Search
CPC ..... G06F 3/0634; G06F 3/0679; G06F 3/0604
See application file for complete search history.

(56) References Cited

U.S. PATENT DOCUMENTS

| | | | |
|---|---|---|---|
| 11,449,244 B2 * | 9/2022 | Chen ..................... | G06F 3/0655 |
| 2020/0201774 A1 * | 6/2020 | Park ................... | G11C 11/5642 |
| 2021/0064548 A1 * | 3/2021 | Grosz ................ | G06F 12/0246 |
| 2022/0004489 A1 * | 1/2022 | Cariello ................. | G06F 3/061 |
| 2022/0012174 A1 * | 1/2022 | Seok ....................... | G06F 3/061 |
| 2022/0300433 A1 * | 9/2022 | Byun ................. | G06F 12/0246 |

FOREIGN PATENT DOCUMENTS

| | | |
|---|---|---|
| KR | 10-2020-0122086 A | 10/2020 |
| KR | 10-2021-0143387 A | 11/2021 |

* cited by examiner

*Primary Examiner* — Mark A Giardino, Jr.

(57) ABSTRACT

Provided herein may be a storage device capable of efficiently managing a host mapping table. The storage device may include a memory device and a memory controller configured to generate map information in which a physical address of the memory device is mapped to a logical address provided from a host, to provide a first map segment among a plurality of map segments included in the map information to the host, and to generate map change information when the first map segment is changed.

20 Claims, 11 Drawing Sheets

MAP SEGMENT A

| LA | PA |
|----|-----|
| 1 | 101 |
| 2 | 102 |
| ⋮ | ⋮ |
| 11 | 111 |
| 12 | 112 |
| ⋮ | ⋮ |
| 15 | 115 |
| 16 | 116 |
| 17 | 117 |
| ⋮ | ⋮ |
| 100 | 200 |

LA REGION

FIG. 4

MAP CHANGE INFORMATION (121)

| MAP ID | UPDATE COUNT | CONDITION |
|--------|--------------|--------------|
| A | 5 | partial dirty |
| B | 15 | full dirty |
| C | 0 | clean |

CHANGED MAP SEGMENT (122)

| LA | PA |
|----|-----|
| 11 | 901 |
| 12 | 902 |
| 15 | 903 |
| 16 | 910 |
| 17 | 911 |

FIG. 6A

MAP CHANGE INFORMATION   121

| MAP ID | UPDATE COUNT | CONDITION |
|--------|--------------|-----------|
| A | 5 | partial dirty |
| B | 15 | full dirty |
| C | 0 | clean |

110 MEMORY DEVICE

CMD_READ, PA_301

130 MEMORY CONTROLLER

REQ_READ, L2P_201

200 HOST

111c

MAP SEGMENT C

L2P_201

| LA | PA |
|-----|-----|
| 201 | 301 |
| 202 | 302 |
| ... | ... |
| 300 | 400 |

FIG. 8

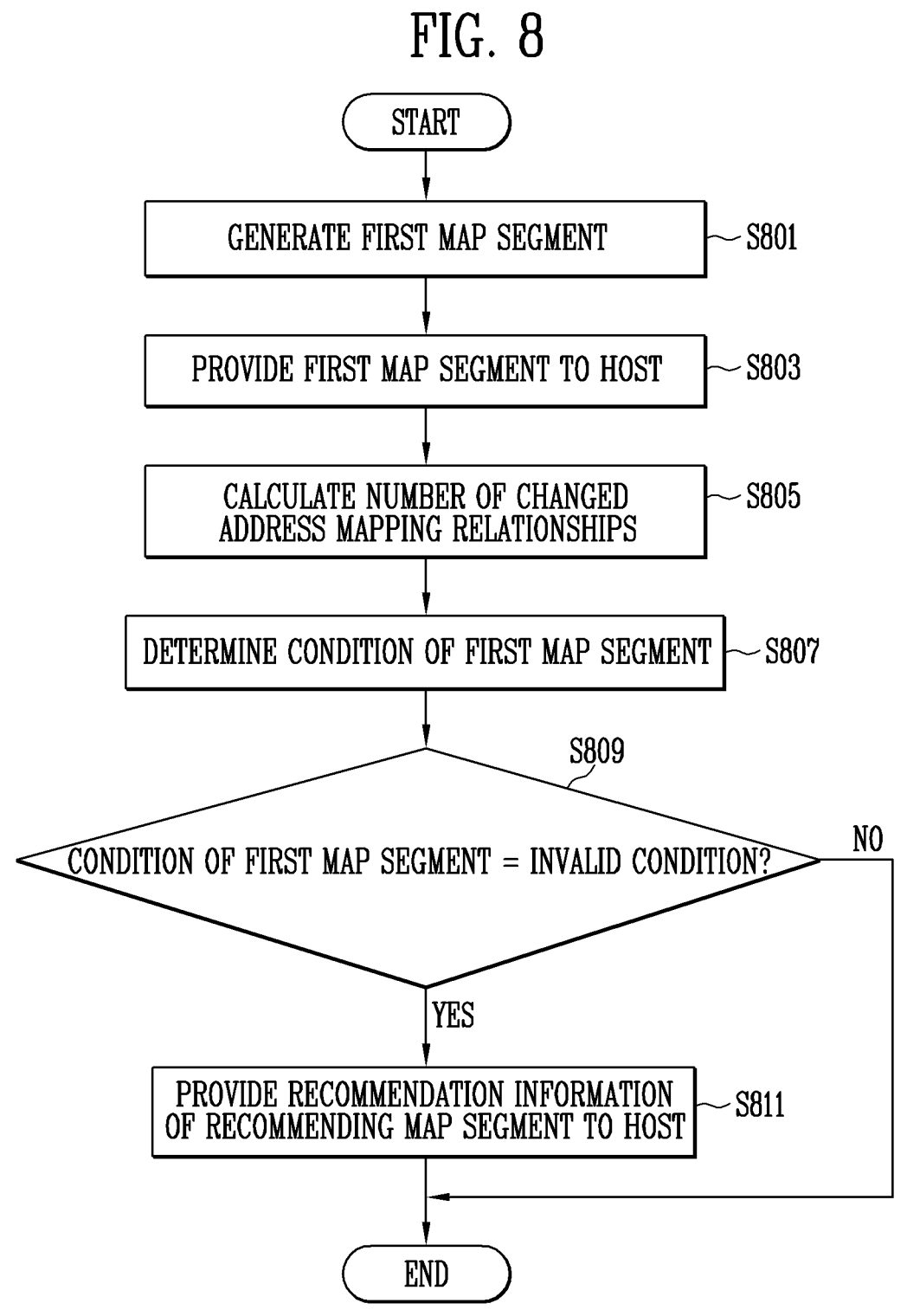

START

GENERATE FIRST MAP SEGMENT — S801

PROVIDE FIRST MAP SEGMENT TO HOST — S803

CALCULATE NUMBER OF CHANGED ADDRESS MAPPING RELATIONSHIPS — S805

DETERMINE CONDITION OF FIRST MAP SEGMENT — S807

S809

CONDITION OF FIRST MAP SEGMENT = INVALID CONDITION?    NO

YES

PROVIDE RECOMMENDATION INFORMATION OF RECOMMENDING MAP SEGMENT TO HOST — S811

END

STORAGE DEVICE FOR MANAGING MAP INFORMATION PROVIDED TO HOST AND METHOD OF OPERATING THE SAME

CROSS-REFERENCE TO RELATED APPLICATION

The present application claims priority under 35 U.S.C. § 119(a) to Korean patent application number 10-2023-0135219 filed on Oct. 11, 2023, in the Korean Intellectual Property Office, the entire disclosure of which is incorporated by reference herein.

BACKGROUND

1. Technical Field

Various embodiments of the present disclosure generally relate to a semiconductor device, and more particularly to a storage device for managing map information provided to a host and a method of operating the storage device.

2. Related Art

A storage device may include a memory device that stores data, and may control the operation of the memory device in response to a request received from a host.

An operation performed in response to the request received from the host or an internal operation independently produced in the storage device may be implemented by the storage device, performing an address translation operation of translating a logical address (LA) provided from the host into the physical address (PA) of the memory device. In this case, a mapping table including address mapping relationships between logical addresses and physical addresses, that is, a logical-to-physical (L2P) mapping table, is used.

Meanwhile, as the capacity of the memory device becomes larger, the size of the mapping table inevitably increases, and the time required by the storage device to search the mapping table is lengthened, with the result that the operating speed of the memory device may be deteriorated. In order to solve this problem, a plurality of host mapping tables may be provided in the host, and the mapping table of the storage device may be synchronized with the plurality of host mapping tables, thus enabling an address translation operation to be prioritized in the host. This operation may be referred to as a "host performance booster (HPB) operation."

SUMMARY

Various embodiments of the present disclosure are directed to a storage device that is capable of efficiently managing a host mapping table and a method of operating the storage device.

An embodiment of the present disclosure may provide for a storage device. The storage device may include a memory device and a memory controller configured to generate map information in which a physical address of the memory device is mapped to a logical address provided from a host, to provide a first map segment among a plurality of map segments included in the map information to the host, and to generate map change information when the first map segment is changed.

An embodiment of the present disclosure may provide for a method of operating a storage device. The method may include generating a first map segment including a plurality of address mapping relationships between a plurality of logical addresses and a plurality of physical addresses, providing the first map segment to a host, calculating a number of changed address mapping relationships among the plurality of address mapping relationships, determining whether the first map segment is valid based on the number of changed address mapping relationships, receiving an operation request and an address mapping relationship associated with a logical address included in the first map segment from the host, and determining a storage region on which the operation corresponding to the request is to be performed based on whether the first map segment is valid.

BRIEF DESCRIPTION OF THE DRAWINGS

FIG. 2 is a diagram illustrating a map segment according to an embodiment of the present disclosure.

FIG. 4 is a diagram illustrating a changed map segment according to an embodiment of the present disclosure.

FIG. 6A is a diagram illustrating an example in which a read operation corresponding to a read request is performed according to an embodiment of the present disclosure.

FIG. 8 is a flowchart illustrating an example in which a map segment is recommended according to an embodiment of the present disclosure.

DETAILED DESCRIPTION

Specific structural or functional descriptions in the embodiments of the present disclosure introduced in this specification or application are provided as examples to describe embodiments according to the concept of the present disclosure. The embodiments according to the concept of the present disclosure may be practiced in various forms, and should not be construed as being limited to the embodiments described in the specification or application.

Figure 1:
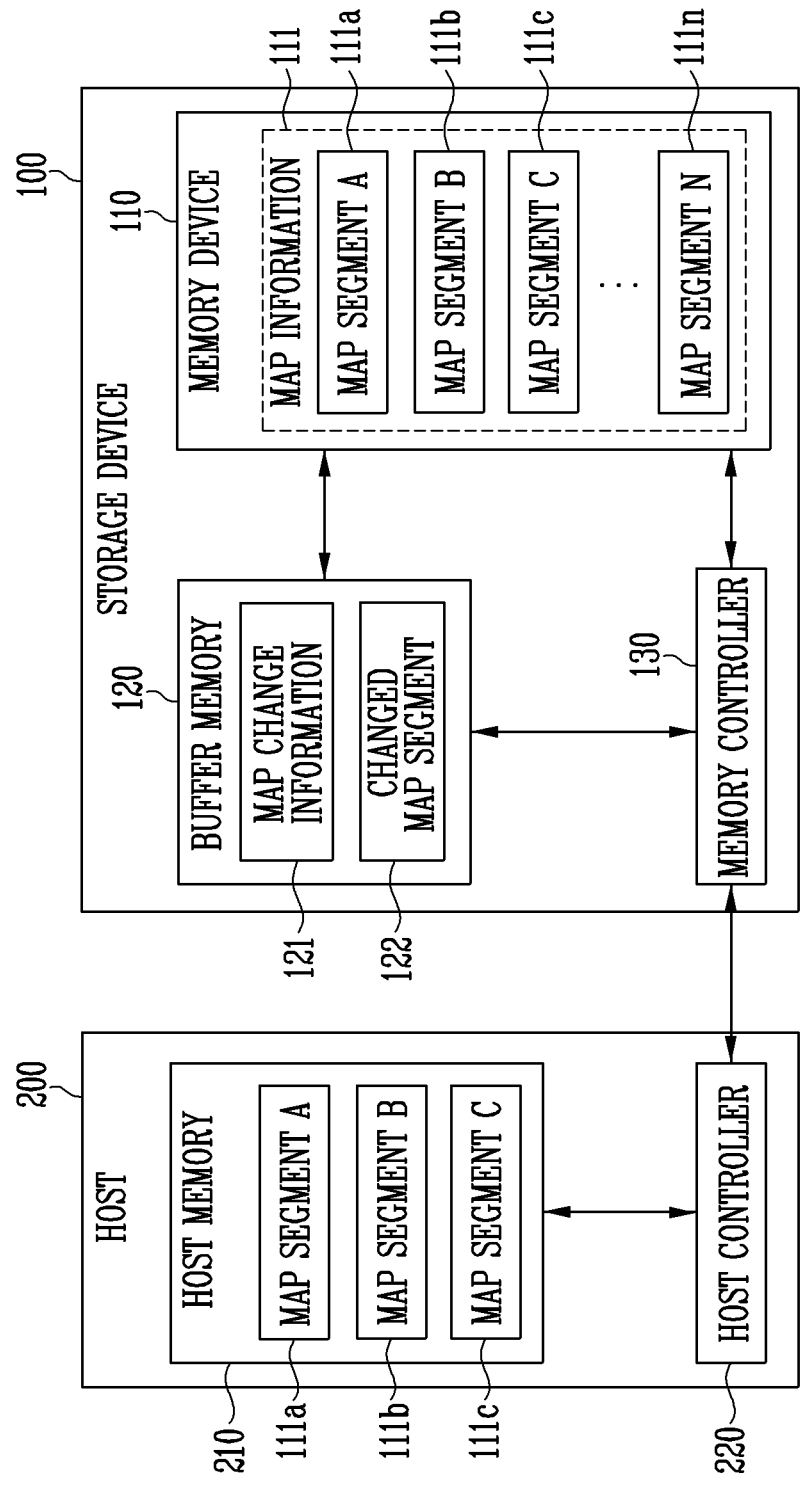
FIG. 1 is a diagram illustrating a computing system according to an embodiment of the present disclosure.

FIG. 1 is a diagram illustrating a computing system according to an embodiment of the present disclosure.

Referring to FIG. 1, a computing system 10 may include a storage device 100 and a host 200.

In an embodiment, the storage device 100 may be a device that stores data under the control of the host 200.

The storage device 100 may be manufactured as any one of various types of storage devices, such as a solid state drive (SSD) and universal flash storage (UFS), depending on a host interface that is a scheme for communication with the host 200. Furthermore, the storage device 100 may be manufactured in any one of various types of package forms such as a system on chip (SOC).

The storage device 100 may include a memory device 110, a buffer memory 120, and a memory controller 130.

The memory device 110 may be a nonvolatile memory.

The memory device 110 may include a memory cell array including a plurality of memory cells that store data.

The memory cell array may include a plurality of memory blocks. Each memory block may include a plurality of memory cells. One memory block may include a plurality of pages. In an embodiment, each page may be the unit by which data is stored in the memory device 110 in a program operation (write operation) or by which data stored in the memory device 110 is read in a read operation. A memory block may be the unit by which data is erased in an erase operation.

The memory device 110 may receive a command and an address from the memory controller 130, and may perform an operation indicated by the command on the region of the memory cell array, selected by the address.

In an embodiment, the memory device 110 may store map information 111.

In an embodiment, the map information 111 may be information in which the physical address of the memory device 110 is mapped to a logical address provided from the host 200. In the present application, a logical address and a "logical block address" may be used interchangeably with each other. In the present application, a physical address and a "physical block address" may be used interchangeably with each other.

The map information 111 may include a plurality of map segments 111a to 111n. Each map segment may include map information corresponding to a logical address region including a plurality of logical addresses. Each map segment may include a plurality of address mapping relationships between a plurality of logical addresses and a plurality of physical addresses mapped to the plurality of logical addresses.

In an embodiment, a first map segment among the plurality of map segments 111a to 111n may be provided to the host 200. Here, the first map segment may include a plurality of first map segments. For example, the plurality of first map segments may indicate an a-th map segment to a c-th map segment 111a to 111c among the plurality of map segments 111a to 111n.

The buffer memory 120 may be a volatile memory.

The buffer memory 120 may store various types of information required for the operation of the memory controller 130 in the form of firmware (FW).

In an embodiment, the buffer memory 120 may store map change information 121 and a changed map segment 122.

In an embodiment, the map change information 121 and the changed map segment 122 may be stored in the memory device 110.

When the plurality of first map segments 111a to 111c provided to the host 200 are changed depending on the operation of the memory device 110, the map change information 121 may be information indicating whether the corresponding first map segments 111a to 111c have been changed.

The changed map segment 122 may be information including changed address mapping relationships among the plurality of address mapping relationships included in the first map segments 111a to 111c when the first map segments 111a to 111c provided to the host 200 are changed.

In an embodiment, the buffer memory 120 may store some of the plurality of map segments 111a to 111n. Here, the map segments stored in the buffer memory 120 may be either the first map segments 111a to 111c provided to the host 200 or frequently accessed map segments.

The memory controller 130 may control the overall operation of the storage device 100.

In an embodiment, the memory controller 130 may include a processor capable of running firmware, a host interface capable of communicating with the host 200, a memory interface capable of communicating with the memory device 110 and the buffer memory 120, an error correction circuit capable of correcting errors in data, etc.

When power is applied to the storage device 100, the memory controller 130 may run the firmware stored in the buffer memory 120. When the memory device 110 is a flash memory device, the firmware may include a host interface layer (HIL) that controls communication with the host 200, a flash translation layer (FTL) that controls communication between the host 200 and the memory device 110, and a flash interface layer (FIL) that controls communication with the memory device 110.

The memory controller 130 may provide a command, an address, or data related to the corresponding operation to the memory device 110 so that a program/write operation, a read operation or an erase operation is performed in response to the request of the host 200.

In an embodiment, the memory controller 130 may independently generate a command, an address, and data regardless of a request from the host 200, and may transmit them to the memory device 110. For example, the memory controller 130 may provide the memory device 110 with commands, addresses, and data that are required for performing background operations associated with performance of internal operations such as wear leveling, read reclaim, and garbage collection operations.

In an embodiment, the memory controller 130 may be coupled to a plurality of memory devices through channels. The memory controller 130 may control a plurality of memory devices according to an interleaving scheme so as to improve operational performance. The interleaving scheme may be a scheme for controlling the memory devices 110 so that the operations of at least two memory devices 110 overlap each other.

In an embodiment, the memory controller 130 may update the map information 111 during a write operation. For example, the memory controller 130 may receive data, a write request, and a logical address from the host 200. A logical address may be translated into a physical address indicating the address of memory cells in which data is to be stored in the memory device 110. Here, an address mapping relationship between the logical address and the physical address translated through the FTL may be added to the map information 111.

In an embodiment, the memory controller 130 may require an address mapping relationship associated with read data during a read operation. When the address mapping relationship corresponding to the read data is stored in the buffer memory 120, the memory controller 130 may generate a read command corresponding to a received read request and transfer the read command to the memory device 110. When the address mapping relationship corresponding to the read data is not stored in the buffer memory 120, the memory controller 130 may first transfer a read command for the address mapping relationship to the memory device 110. When the memory device 110 reads the address mapping relationship and transfers the same to the memory controller 130, the memory controller 130 may transfer the read command for reading data, together with the physical address corresponding to the received address mapping relationship, to the memory device 110.

The buffer memory 120 may have capacity smaller than that of the host memory 210, wherein a space in which map segments are to be stored may be insufficient. According to the host performance booster (HPB) operation, all or part of the map information 111 in the memory device 110 may be retained in the host memory 210 so as to improve caching performance for the map information 111. In this case, the host 200 may provide an address mapping relationship indicating a region from which data is to be read, among pieces of map information 111 included in the host memory 210, to the storage device 100 when making a read request. A cache-hit probability for the map information 111 may be increased compared to the case where map segments are stored only in the buffer memory 120. Accordingly, a data read speed may be increased between the host 200 and the storage device 100.

In an embodiment, the memory controller 130 may select some map segments, such as the first map segments 111a to 111c, from among the plurality of map segments 111a to 111n included in the map information 111. The memory controller 130 may select map segments corresponding to a logical address region in which there are a larger number of cache hits from the memory device 110 to the buffer memory 120 or for which a larger number of read request are received from the host 200. The memory controller 130 may provide the selected first map segments 111a to 111c to the host 200. Further, the memory controller 130 may store the selected first map segments 111a to 111c in the buffer memory 120.

In an embodiment, when the first map segments 111a to 111c provided to the host 200 are changed depending on the operation of the memory device 110, the memory controller 130 may generate map change information 121 and a changed map segment 122 related to the first map segments 111a to 111c. Here, the operation of the memory device may include not only the operation corresponding to the request of the host 200 but also the internal operation independently performed by the storage device 100. The memory controller 130 may control the operation requested by the host 200 or determine the time point at which a map segment to be provided to the host 200 is to be recommended, based on the map change information 121 and the changed map segment 122.

In an embodiment, the host 200 may communicate with the storage device 100 using at least one of various communication methods such as universal serial bus (USB), serial AT attachment (SATA), serial attached SCSI (SAS), high speed interchip (HSIC), small computer system interface (SCSI), peripheral component Interconnection (PCI), PCI express (PCIe), nonvolatile memory express (NVMe), universal flash storage (UFS), secure digital (SD), multimedia card (MMC), embedded MMC (eMMC), dual in-line memory module (DIMM), registered DIMM (RDIMM), and load reduced DIMM (LRDIMM).

In an embodiment, the host 200 may include the host memory 210 and a host controller 220.

The host memory 210 may function as a main memory, a working memory, a buffer memory or a cache memory of the host 200. The host memory 210 may include a volatile memory such as DRAM or SRAM.

In an embodiment, the host memory 210 may store the first map segments 111a to 111c provided from the storage device 100.

The host controller 220 may run an application, an operating system (OS), etc. for controlling the computing system 10. For example, the host controller 220 may include processors, interfaces, graphic engines, etc., which run the application, the operating system, etc.

When transferring a read request to the storage device 100, the host controller 220 may transfer the address mapping relationship received from the host memory 210, together with the read request, to the storage device 100. For example, when the address mapping relationship with the logical address of data, corresponding to the read request to be transferred to the storage device 100, is stored in the host memory 210, the host controller 220 may transfer the corresponding address mapping relationship, together with the read request, to the storage device 100. Unlike this case, when the address mapping relationship with the logical address of data, corresponding to the read request to be transferred to the storage device 100, is not stored in the host memory 210, the host controller 220 may transfer only the read request to the storage device 100.

FIG. 2 is a diagram illustrating a map segment according to an embodiment of the present disclosure.

Although, in FIG. 2, for convenience of description, description will be made based on map segment A 111a, the same method as that of map segment A 111a may be applied to other map segments.

Referring to FIG. 2, map segment A 111a may include a plurality of address mapping relationships between a plurality of logical addresses LA_1 to LA_100 and a plurality of physical addresses PA_101 to PA_200 mapped to the plurality of logical addresses LA_1 to LA_100. Here, the plurality of logical addresses LA_1 to LA_100 may be included in one logical address region LA REGION.

In an embodiment, map segment A 111a may be map information corresponding to the one logical address region LA REGION.

Although, in FIG. 2, one logical address region LA REGION is described as including 100 logical addresses, the present disclosure is not limited thereto, and the number of logical addresses may be less than or greater than 100 according to an embodiment.

Figure 3:
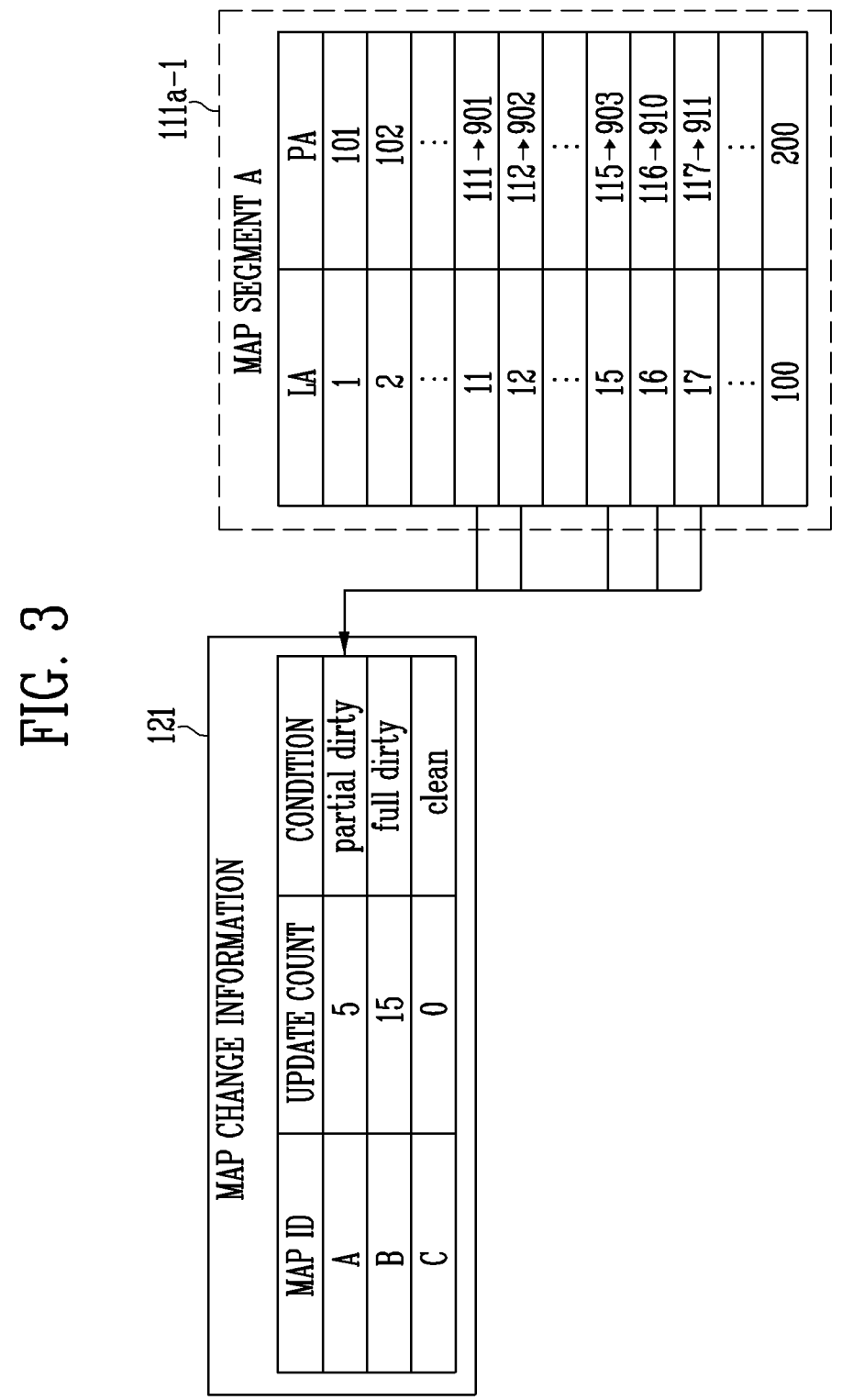
FIG. 3 is a diagram illustrating map change information according to an embodiment of the present disclosure.

FIG. 3 is a diagram illustrating map change information according to an embodiment of the present disclosure.

Referring to FIG. 3, the map change information 121 may include map identification information MAP ID of respective map segments 111a to 111c provided to the host 200, the number of changed address mapping relationships UPDATE COUNT among a plurality of address mapping relationships included in each of the map segments 111a to 111c, and condition (state) information CONDITION of respective map segments.

In an embodiment, in map segment A 111a-1 stored in the buffer memory 120, address mapping relationships associated with logical addresses LA_11, LA_12, LA_15, LA_16, and LA_17 may be changed. In this case, because five address mapping relationships are changed, the number of changed address mapping relationships UPDATE COUNT for map segment A 111a-1 may be 5.

In an embodiment, the condition information CONDITION may indicate the conditions of respective map segments 111a to 111c depending on the number of changed address mapping relationships UPDATE COUNT.

In an embodiment, the condition information CONDITION may include at least one of a 'clean' condition in which there is no changed address mapping relationship, a 'partial dirty' condition in which the number of changed address mapping relationships UPDATE COUNT is less than a preset number, and a 'full dirty' condition in which the number of changed address mapping relationships UPDATE COUNT is equal to or greater than the preset number. Here, the 'clean' condition may correspond to a valid condition, the 'partial dirty' condition may correspond to a partial valid condition, and the 'full dirty' condition may correspond to an invalid condition.

In an embodiment, because map segment C 111c does not have a changed address mapping relationship, it may be in a 'clean' condition.

In an embodiment, when the preset number is 10, map segment A 111a may be in a 'partial dirty' condition because the number of changed address mapping relationships UPDATE COUNT is five which is less than the preset number.

In an embodiment, when the preset number is 10, map segment B 111b may be in a 'full dirty' condition because the number of changed address mapping relationships UPDATE COUNT is 15 which is greater than the preset number.

FIG. 4 is a diagram illustrating a changed map segment according to an embodiment of the present disclosure.

Referring to FIG. 4, when individual map segments 111a to 111c provided to the host 200 correspond to a 'partial dirty' condition, the memory controller 130 may generate a changed map segment 122. In an embodiment, the changed map segment 122 may include a new address mapping relationship with a logical address included in each changed address mapping relationship.

For example, because address mapping relationships associated with logical addresses LA_11, LA_12, LA_15, LA_16, and LA_17 have changed in map segment A 111a-1 as shown in FIG. 3, the memory controller 130 may generate a changed map segment 122 including new address mapping relationships with the logical addresses LA_11, LA_12, LA_15, LA_16, and LA_17.

In an embodiment, when individual map segments 111a to 111c provided to the host 200 correspond to a 'full dirty' condition, the memory controller 130 may remove the changed map segment 122 for the corresponding map segment.

For example, because map segment B 111b corresponds to a 'full dirty' condition, the changed map segment 122 for map segment B 111b may be removed from the buffer memory 120.

Figure 5:
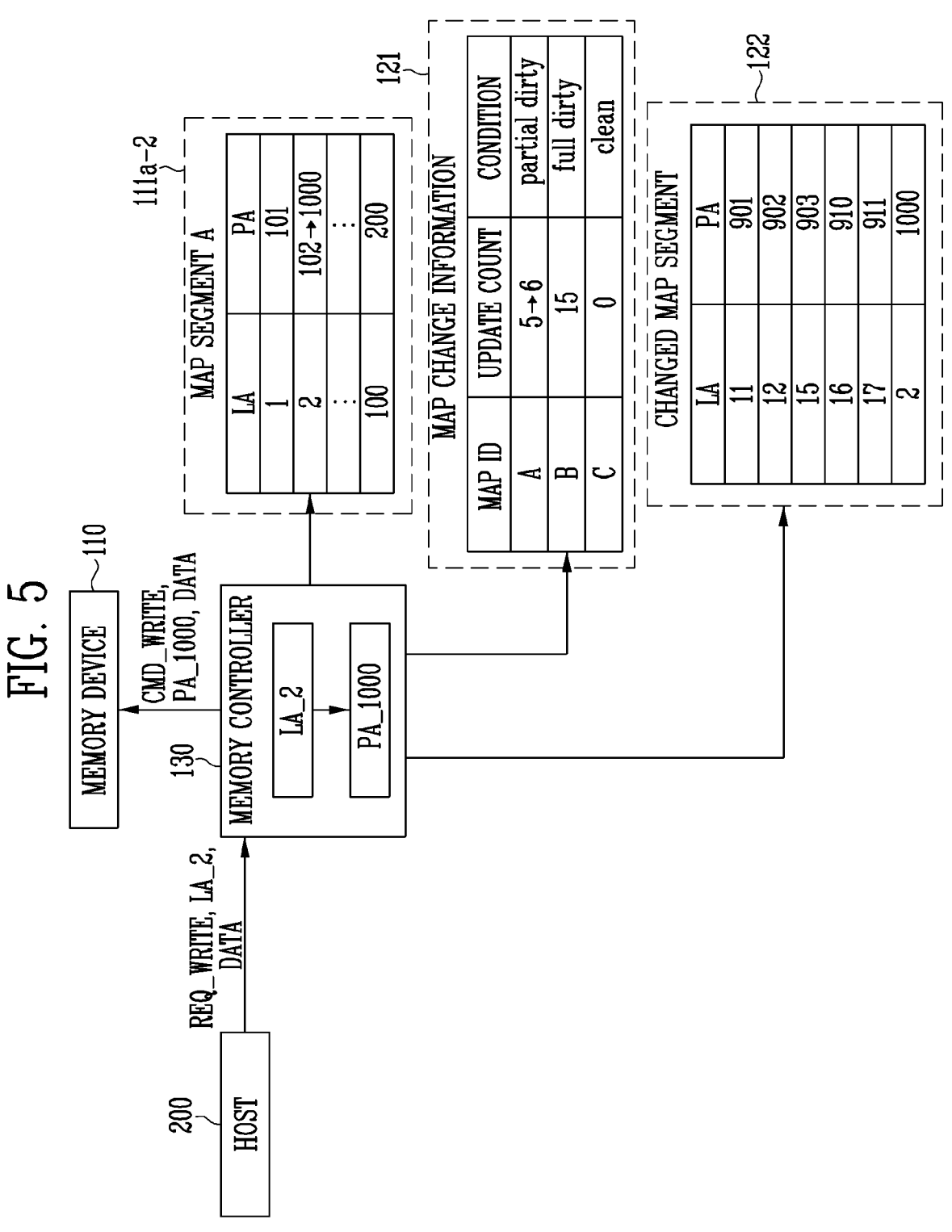
FIG. 5 is a diagram illustrating an example in which a map segment is changed depending on a write operation according to an embodiment of the present disclosure.

FIG. 5 is a diagram illustrating an example in which a map segment is changed depending on a write operation according to an embodiment of the present disclosure.

Referring to FIG. 5, the memory controller 130 may receive data DATA, a write request REQ_WRITE, and a logical address LA_2 corresponding to the write request REQ_WRITE from the host 200. The memory controller 130 may map a physical address PA_1000 to the logical address LA_2. The memory controller 130 may generate a write command CMD_WRITE, and may provide the data DATA, the write command CMD_WRITE, and the physical address PA_1000 to the memory device 110.

In an embodiment, the memory controller 130 may update the changed map segment 122 depending on whether map segment A 111a-2 includes an address mapping relationship associated with the logical address LA_2.

For example, because map segment A 111a-2 includes the address mapping relationship associated with the logical address LA_2, the memory controller 130 may update the changed map segment 122 for map segment A 111a-2.

In an embodiment, the memory controller 130 may increase the number of changed address mapping relationships UPDATE COUNT for map segment A 111a, provided to the host 200, in the map change information 121.

In an embodiment, the memory controller 130 may include the address mapping relationship between the logical address LA_2 and the physical address PA_1000 in the changed map segment 122.

Meanwhile, unlike the example illustrated in FIG. 5, when map segment A 111a-2 does not include a logical address corresponding to the write request REQ_WRITE, a physical address may be mapped to the logical address, and a new address mapping relationship may be updated in the map information 111.

FIG. 6A is a diagram illustrating an example in which a read operation corresponding to a read request is performed according to an embodiment of the present disclosure. In detail, FIG. 6A is a diagram for explaining an example in which a read operation is performed when a map segment corresponds to a 'clean' condition in which there is no changed address mapping relationship.

Referring to FIG. 6A, the memory controller 130 may receive a read request REQ_READ and an address mapping relationship L2P_201 associated with a logical address LA_201 included in map segment C 111c from the host 200.

In an embodiment, the memory controller 130 may determine the region of the memory device 110 on which a read operation corresponding to the read request REQ_READ is to be performed based on condition information CONDITION.

For example, when map segment C 111c corresponds to a 'clean' condition, the memory controller 130 may acquire a physical address PA_301 based on the address mapping relationship L2P_201 associated with the logical address LA_201 received from the host 200. The memory controller 130 may control the memory device 110 to read data from a region corresponding to the acquired physical address PA_301. In this case, the memory controller 130 may generate a read command CMD_READ, and may provide the read command CMD_READ and the physical address PA_301 to the memory device 110.

Figure 6B:
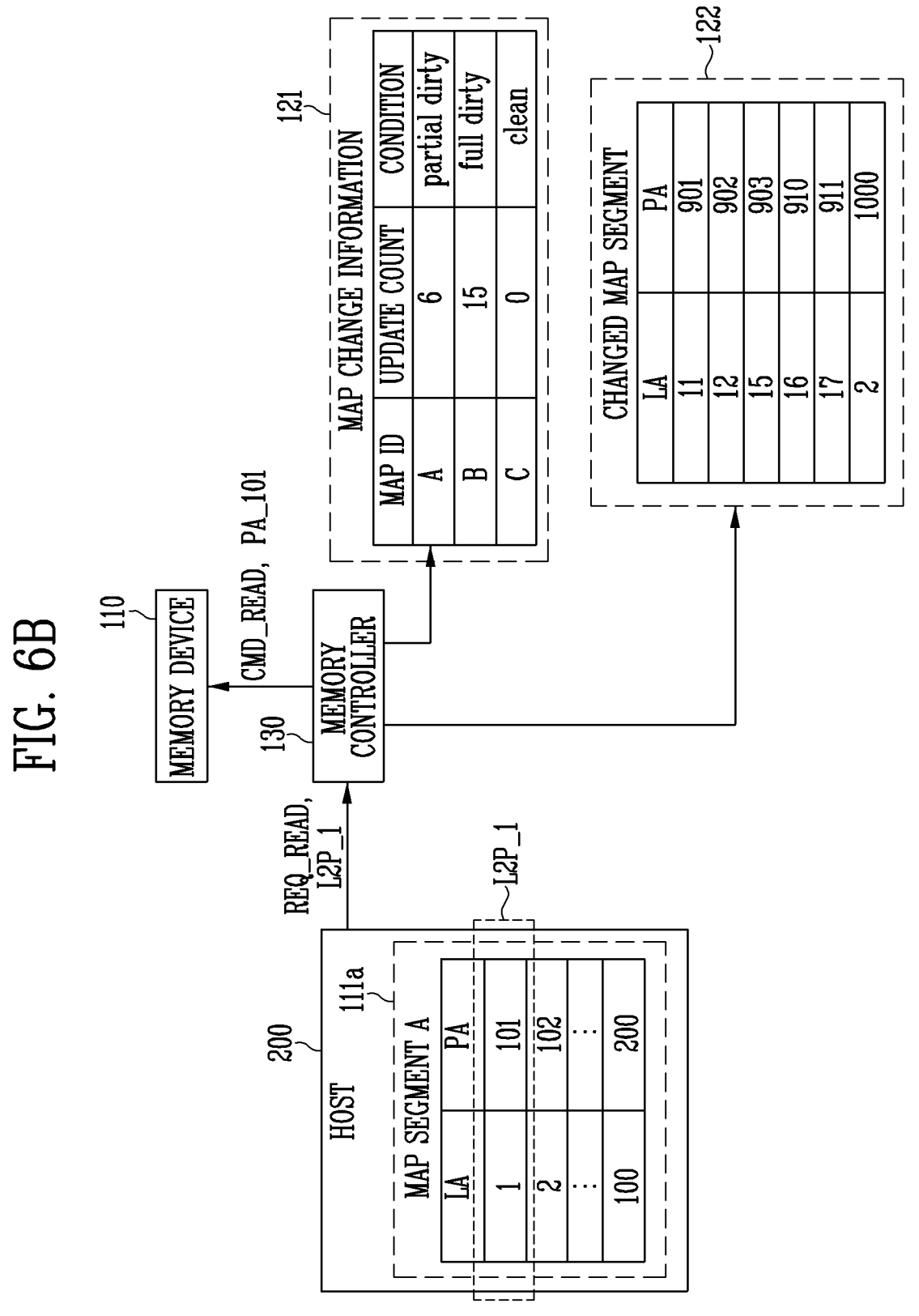
FIG. 6B is a diagram illustrating an example in which a read operation corresponding to a read request is performed according to an embodiment of the present disclosure.

FIG. 6B is a diagram illustrating an example in which a read operation corresponding to a read request is performed according to an embodiment of the present disclosure. In detail, FIG. 6B is a diagram for explaining an example in which a read operation is performed when a map segment corresponds to a 'partial dirty' condition in which the number of changed address mapping relationships is less than a preset number.

Referring to FIG. 6B, the memory controller 130 may receive a read request REQ_READ and an address mapping relationship L2P_1 associated with a logical address LA_1 included in map segment A 111a from the host 200.

In an embodiment, when map segment A 111a corresponds to a 'partial dirty' condition and the changed map segment 122 does not include an address mapping relationship associated with the logical address LA_1, the memory controller 130 may acquire a physical address PA_101 based on the address mapping relationship L2P_1 associated with the logical address LA_1 received from the host 200. The memory controller 130 may control the memory device 110 to read data from a region corresponding to the acquired physical address PA_101.

In this case, the memory controller 130 may generate a read command CMD_READ, and may provide the read command CMD_READ and the physical address PA_101 to the memory device 110.

Figure 6C:
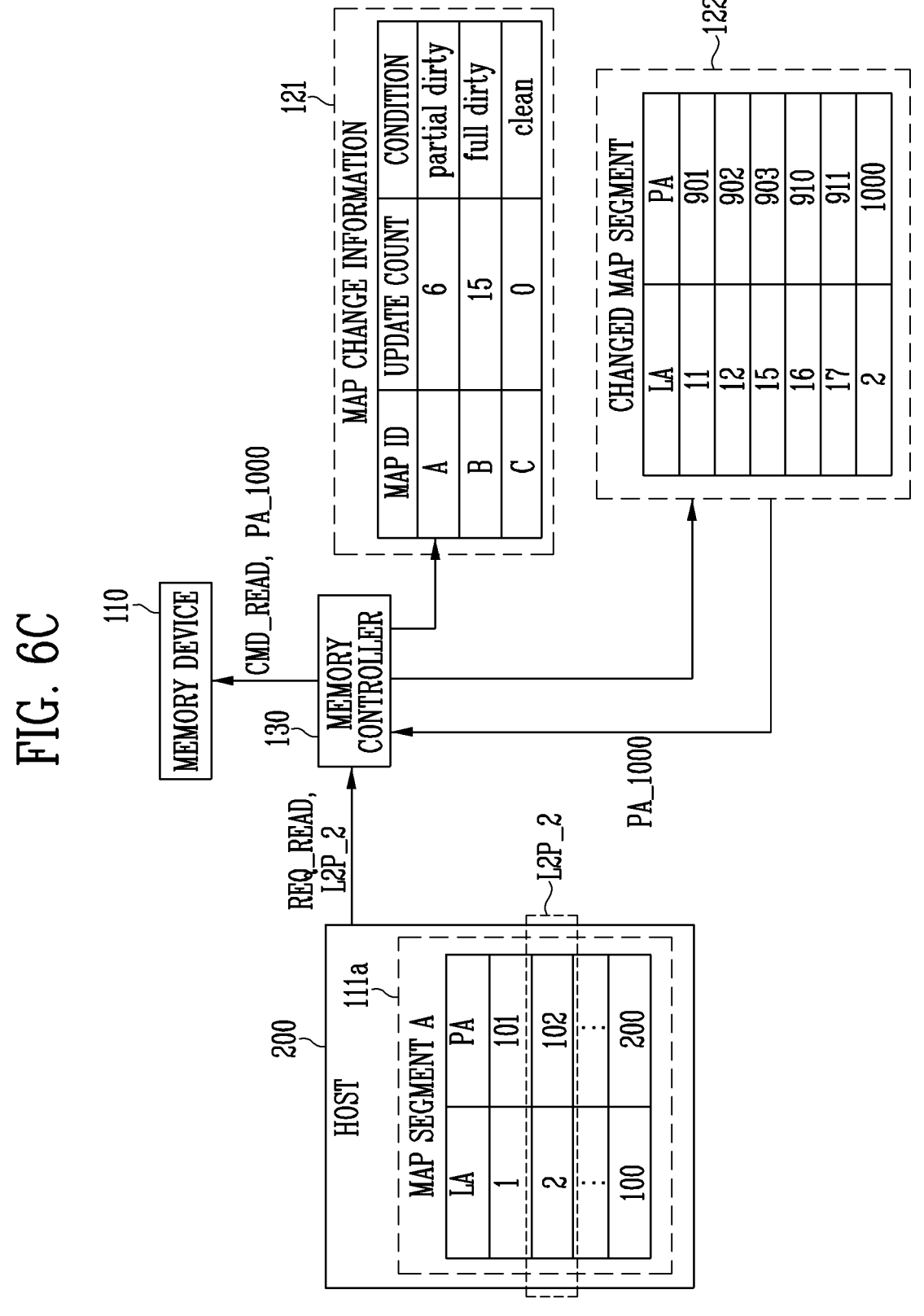
FIG. 6C is a diagram illustrating an example in which a read operation corresponding to a read request is performed according to an embodiment of the present disclosure.

FIG. 6C is a diagram illustrating an example in which a read operation corresponding to a read request is performed according to an embodiment of the present disclosure. In detail, FIG. 6C is a diagram for explaining an example in which a read operation is performed when a map segment corresponds to a 'partial dirty' condition in which the number of changed address mapping relationships is less than a preset number.

Referring to FIG. 6C, the memory controller 130 may receive a read request REQ_READ and an address mapping relationship L2P_2 associated with a logical address LA_2 included in map segment A 111a from the host 200.

In an embodiment, when map segment A 111a corresponds to a 'partial dirty' condition and the changed map segment 122 includes an address mapping relationship associated with the logical address LA_2, the memory controller 130 may acquire a physical address PA_1000 mapped to the logical address LA_2 based on the changed map segment 122. The memory controller 130 may control the memory device 110 to read data from a region corresponding to the physical address PA_1000.

In this case, the memory controller 130 may generate a read command CMD_READ, and may provide the read command CMD_READ and the physical address PA_1000 to the memory device 110.

Figure 6D:
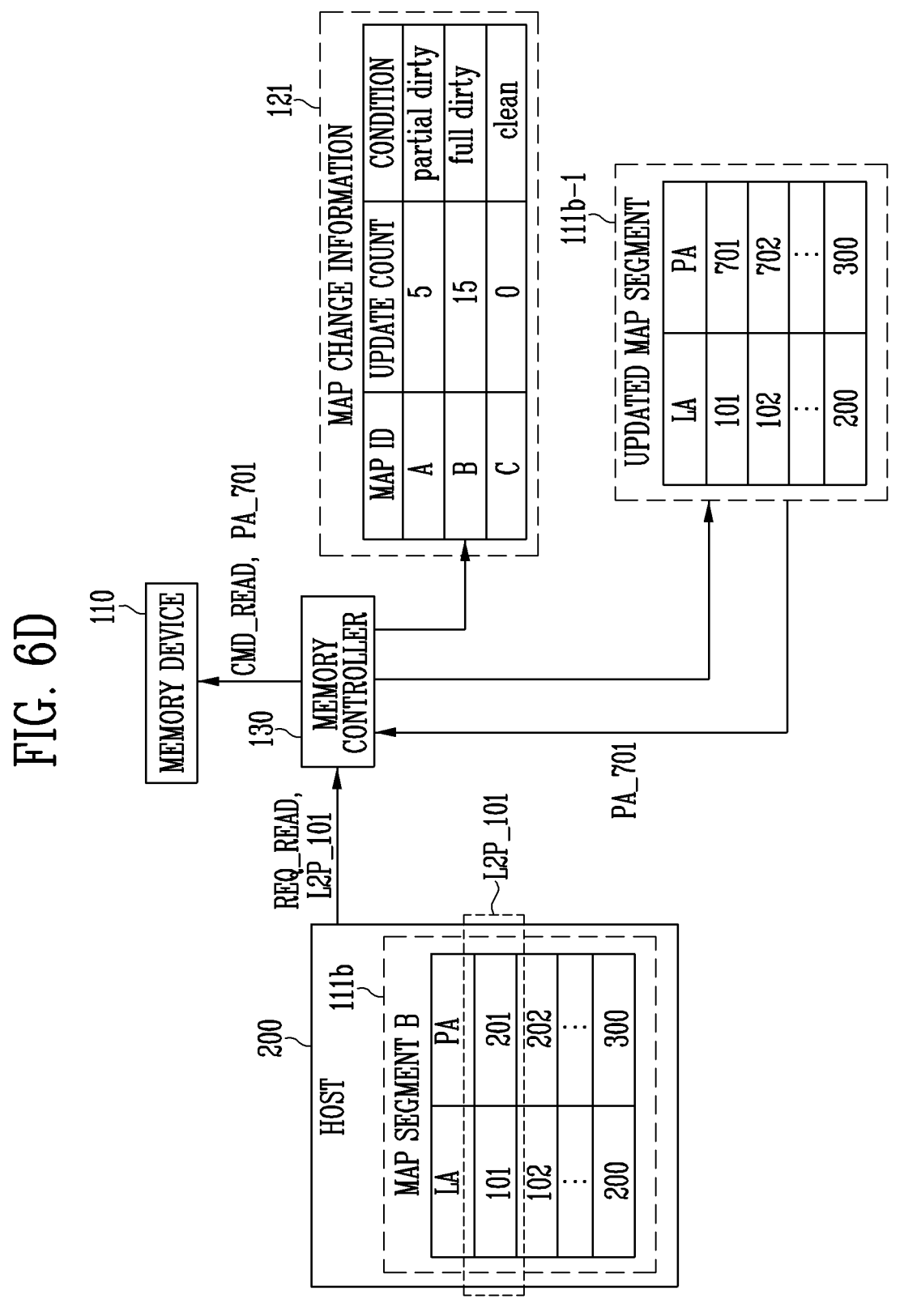
FIG. 6D is a diagram illustrating an example in which a read operation corresponding to a read request is performed according to an embodiment of the present disclosure.

FIG. 6D is a diagram illustrating an example in which a read operation corresponding to a read request is performed according to an embodiment of the present disclosure. In detail, FIG. 6D is a diagram for explaining an example in which a read operation is performed when a map segment corresponds to a 'full dirty' condition in which the number of changed address mapping relationships is equal to or greater than the preset number.

Referring to FIG. 6D, the memory controller 130 may receive a read request REQ_READ and an address mapping relationship L2P_101 associated with a logical address LA_101 from the host 200.

In an embodiment, when map segment B 111b corresponds to a 'full dirty' condition, the memory controller 130 may acquire a physical address mapped to the logical address LA_101 based on the map information 111 of memory device. For example, the map information 111 of memory device may include updated map segment B 111b-1. The memory controller 130 may acquire a physical address PA_701 mapped to the logical address LA_101 based on updated map segment B 111b-1. The memory controller 130 may control the memory device 110 to read data from a region corresponding to the physical address PA_701.

In this case, the memory controller 130 may generate a read command CMD_READ, and may provide the read command CMD_READ and the physical address PA_701 to the memory device 110.

Meanwhile, updated map segment B 111b-1 may include a new address mapping relationship resulting from the update, but it may also include existing address mapping relationships that are not updated.

Figure 7:
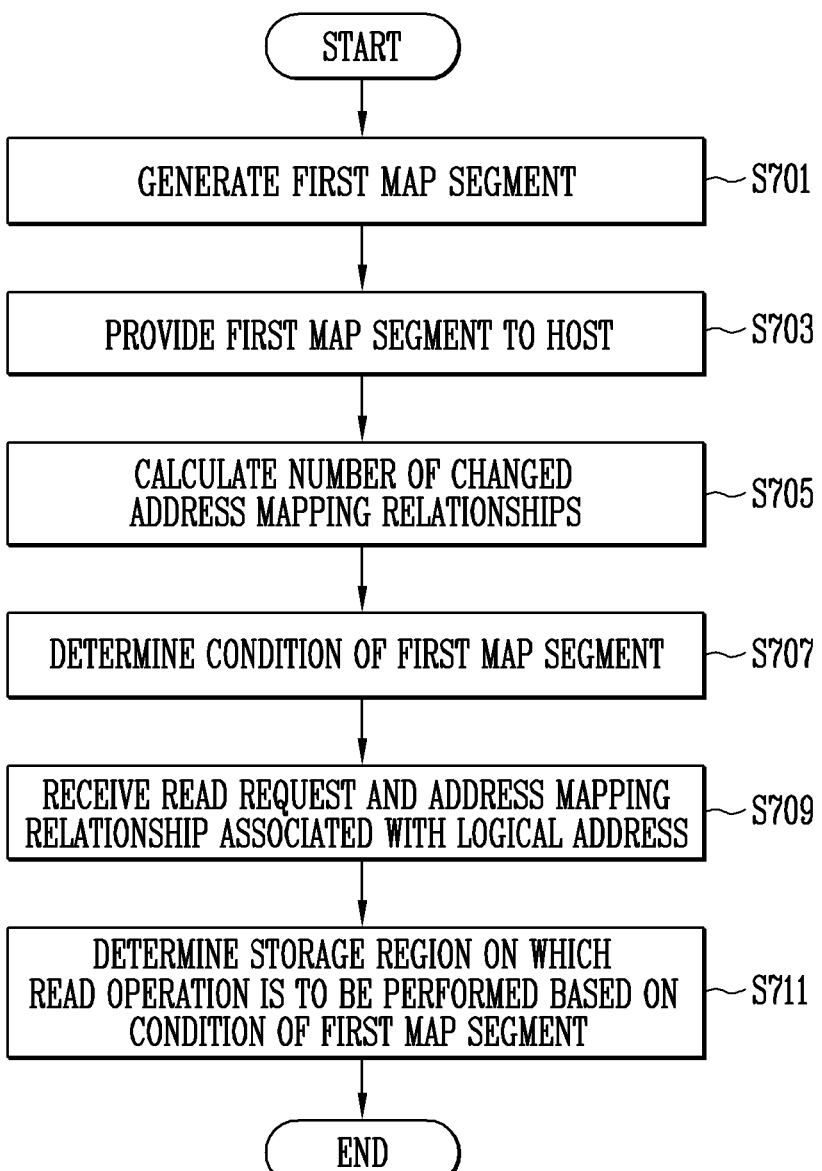
FIG. 7 is a flowchart illustrating a method of operating a storage device according to an embodiment of the present disclosure.

FIG. 7 is a flowchart illustrating a method of operating a storage device according to an embodiment of the present disclosure.

The method illustrated in FIG. 7 may be performed by, for example, the storage device 100 illustrated in FIG. 1.

At step S701, the storage device 100 may generate a first map segment including a plurality of address mapping relationships between a plurality of logical addresses and a plurality of physical addresses.

At step S703, the storage device 100 may provide the first map segment to the host 200.

At step S705, the storage device 100 may calculate the number of changed address mapping relationships (i.e., UPDATE COUNT) depending on the set operation among a plurality of address mapping relationships. Here, the set operation may include a read operation, a write(program) operation or an erase operation corresponding to the request of the host 200 and an internal background operation, such as wear leveling, read reclaim, and garbage collection operations.

At step S707, the storage device 100 may determine whether the first map segment provided to the host is valid based on the number of changed address mapping relationships.

In an example, the storage device 100 may determine the condition of the first map segment to be a valid (clean) condition when there are no changed address mapping relationships (or before the changed address mapping relationship is present).

In an example, the storage device 100 may determine the condition of the first map segment to be a partial dirty (partial valid) condition when the number of changed address mapping relationships is less than a preset number (after one or more of a plurality of address mapping relationships are changed).

In an example, the storage device 100 may determine the condition of the first map segment to be a fully dirty (invalid) condition when the number of changed address mapping relationships is equal to or greater than the preset number (after one or more of a plurality of address mapping relationships are changed).

At step S709, the storage device 100 may receive a read request and an address mapping relationship associated with a logical address included in the first map segment from the host 200.

At step S711, the storage device 100 may determine a storage region on which a read operation corresponding to the read request is to be performed based on whether the first map segment is valid.

In an example, when the condition of the first map segment is a valid condition, the storage device 100 may acquire a physical address based on the address mapping relationship associated with the logical address received from the host 200, and may determine a storage region corresponding to the acquired physical address to be the storage region on which the read operation is to be performed.

In an example, when the condition of the first map segment is a partial valid condition, the storage device 100 may determine a storage region, corresponding to a physical address newly mapped to the logical address received from the host 200, to be a storage region on which the read operation is to be performed in response to the case where the address mapping relationship associated with the logical address received from the host 200 is changed.

In an example, when the condition of the first map segment is a partial valid condition, the storage device 100 may acquire a physical address based on an address mapping relationship associated with the logical address received from the host 200 and determine a storage region corresponding to the acquired physical address to be a storage region on which the read operation is to be performed, in response to the case where the address mapping relationship associated with the logical address received from the host 200 is not changed.

In an example, when the condition of the first map segment is an invalid condition, the storage device 100 may acquire a physical address mapped to the logical address received from the host 200 based on the map information stored in the storage device 100, and may determine a storage region corresponding to the acquired physical address to be a storage region on which the read operation is to be performed.

FIG. 8 is a flowchart illustrating an example in which a map segment is recommended according to an embodiment of the present disclosure.

The method illustrated in FIG. 8 may be performed by, for example, the storage device 100 illustrated in FIG. 1.

At step S801, the storage device 100 may generate a first map segment including a plurality of address mapping relationships between a plurality of logical addresses and a plurality of physical addresses.

At step S803, the storage device 100 may provide the first map segment to the host 200.

At step S805, the storage device 100 may calculate the number of changed address mapping relationships based on the set operation among the plurality of address mapping relationships. Here, the set operation may include a read/write operation or an erase operation corresponding to the request of the host 200 and an internal operation of the storage device, such as wear leveling, read reclaim, and garbage collection operations.

At step S807, the storage device 100 may determine whether the first map segment provided to the host is valid based on the number of changed address mapping relationships.

At step S809, the storage device 100 may determine whether the first map segment is in an invalid condition.

When it is determined at step S809 that the first map segment is in the invalid condition, the storage device 100 may provide recommendation information for recommending a map segment to the host 200 at step S811. Here, the recommended map segment may be an updated map segment including the changed address mapping relationships corresponding to the plurality of logical addresses included in the first map segment before being changed. The updated map segment may be stored in the buffer memory 120 or may be included in map information 111 of the memory device 110. That is, the storage device 100 may recommend the updated map segment to the host 200, and the host 200 may request the updated map segment from the storage device in response to the recommendation information. The storage device 100 may provide the updated map segment in response to the request of the host 200.

In accordance with the present disclosure, there are provided a storage device that is capable of efficiently managing a host mapping table and a method of operating the storage device.

What is claimed is:

1. A storage device, comprising:
   a memory device; and
   a memory controller configured to generate map information in which a physical address of the memory device is mapped to a logical address provided from a host, to provide a first map segment among a plurality of map segments included in the map information to the host, to generate map change information when the first map segment is changed, and in response to a read request from the host, when the first map segment is determined to be partially valid, to determine a physical address based on either an address mapping relationship received from the host or a second map segment including
   a new address mapping relationship with a logical address included in the changed address mapping relationships.

2. The storage device according to claim 1, wherein the first map segment includes a plurality of address mapping relationships between a plurality of logical addresses and a plurality of physical addresses mapped to the plurality of logical addresses.

3. The storage device according to claim 2, wherein the map change information includes a number of changed address mapping relationships among the plurality of address mapping relationships and condition information indicating a condition of the first map segment based on the number of changed address mapping relationships.

4. The storage device according to claim 3, wherein the condition information includes a first condition in which there is no changed address mapping relationship, a second condition in which the number of changed address mapping relationships is less than a preset number, and a third condition in which the number of changed address mapping relationships is equal to or greater than the preset number.

5. The storage device according to claim 3, wherein the memory controller is configured to receive a read request and an address mapping relationship associated with a second logical address included in the first map segment from the host and to determine a region of the memory device on which a read operation corresponding to the read request is to be performed based on the condition information.

6. The storage device according to claim 5, wherein the memory controller is configured to, when the changed address mapping relationships are not present in the first map segment, acquire a second physical address based on an address mapping relationship associated with the second logical address received from the host, and control the memory device to read data from a region corresponding to the second physical address.

7. The storage device according to claim 5, wherein the memory controller is configured to, when the number of changed address mapping relationships is less than a preset number in the first map segment, and the second map segment does not include an address mapping relationship associated with the second logical address, acquire a second physical address based on the address mapping relationship associated with the second logical address received from the host and control the memory device to read data from a region corresponding to the second physical address.

8. The storage device according to claim 5, wherein the memory controller is configured to, when the number of changed address mapping relationships is less than a preset number in the first map segment, and the second map segment includes an address mapping relationship associated with the second logical address, acquire a third physical address mapped to the second logical address based on the second map segment and control the memory device to read data from a region corresponding to the third physical address.

9. The storage device according to claim 5, wherein the memory controller is configured to, when the number of changed address mapping relationships is equal to or greater than a preset number in the first map segment, acquire a fourth physical address mapped to the second logical address based on the map information and control the memory device to read data from a region corresponding to the fourth physical address.

10. The storage device according to claim 2, wherein the memory controller is configured to, when a number of changed address mapping relationships is less than a preset number in the first map segment, generate the second map segment.

11. The storage device according to claim 10, wherein the memory controller is configured to, when the number of changed address mapping relationships is equal to or greater than the preset number in the first map segment, remove the second map segment.

12. The storage device according to claim 10, wherein the memory controller is configured to receive a write request and a first logical address corresponding to the write request from the host, to map a first physical address to the first logical address, and to update the second map segment based on whether the first map segment includes an address mapping relationship associated with the first logical address.

13. The storage device according to claim 12, wherein the memory controller is configured to, when the first map segment includes the address mapping relationship associated with the first logical address, include the address mapping relationship between the first logical address and the first physical address in the second map segment.

14. The storage device according to claim 12, wherein the memory controller is configured to, when the first map segment includes the address mapping relationship associated with the first logical address, change the number of changed address mapping relationships in the map change information.

15. The storage device according to claim 2, wherein the memory controller is configured to, when a number of changed address mapping relationships is equal to or greater than a preset number in the first map segment, provide the host with recommendation information for recommending an updated map segment including the changed address mapping relationships in accordance with the plurality of logical addresses.

16. A method of operating a storage device, comprising:
generating a first map segment including a plurality of address mapping relationships between a plurality of logical addresses and a plurality of physical addresses;
providing the first map segment to a host;
calculating a number of changed address mapping relationships among the plurality of address mapping relationships;
determining whether the first map segment is valid based on the number of changed address mapping relationships;
receiving an operation request and an address mapping relationship associated with a logical address included in the first map segment from the host; and determining a storage region on which the operation corresponding to the operation request is to be performed based on whether the first map segment is valid,
wherein determining the storage region on which the operation corresponding to the operation request is to be performed comprises when the first map segment is determined to be partially valid, determining a physical address based on either the address mapping relationship received from the host or a second map segment including a new address mapping relationship with a logical address included in the changed address mapping relationships.

17. The method according to claim 16, wherein:
determining whether the first map segment is valid comprises:
determining a condition of the first map segment to be valid in response to a case where there is no changed address mapping relationship, and
determining the storage region comprises:
acquiring a physical address based on the address mapping relationship associated with the logical address received from the host; and
determining the acquired physical address to be the storage region.

18. The method according to claim 16, wherein determining whether the first map segment is valid comprises:
determining a condition of the first map segment to be partial valid in response to a case where the number of changed address mapping relationships is less than a preset number.

19. The method according to claim 18, wherein determining the storage region comprises:
determining a physical address newly mapped to the logical address to be the storage region.

20. The method according to claim 16, wherein:
determining whether the first map segment is valid comprises:
determining a condition of the first map segment to be invalid in response to a case where the number of changed address mapping relationships is equal to or greater than a preset number, and
determining the storage region comprises:
acquiring a physical address mapped to the logical address based on map information, and determining the acquired physical address to be the storage region.

\* \* \* \* \*